United States Patent
Karampuri et al.

(10) Patent No.: US 11,288,237 B2
(45) Date of Patent: Mar. 29, 2022

(54) DISTRIBUTED FILE SYSTEM WITH THIN ARBITER NODE

(71) Applicant: Red Hat, Inc., Raleigh, NC (US)

(72) Inventors: Pranith Kumar Karampuri, Jeedimetla (IN); Karthik Subrahmanya, Karkala Taluk (IN); Ravishankar Narayanankutty, Bellandur (IN); Ashish Pandey, Bareilly (IN)

(73) Assignee: Red Hat, Inc., Raleigh, NC (US)

( * ) Notice: Subject to any disclaimer, the term of this patent is extended or adjusted under 35 U.S.C. 154(b) by 302 days.

(21) Appl. No.: 16/182,432

(22) Filed: Nov. 6, 2018

(65) Prior Publication Data

US 2020/0142977 A1   May 7, 2020

(51) Int. Cl.
*G06F 16/182* (2019.01)
*G06F 16/172* (2019.01)
*G06F 16/178* (2019.01)

(52) U.S. Cl.
CPC ........ *G06F 16/1844* (2019.01); *G06F 16/172* (2019.01); *G06F 16/178* (2019.01)

(58) Field of Classification Search
CPC ... G06F 16/1844; G06F 16/178; G06F 16/172
See application file for complete search history.

(56) References Cited

U.S. PATENT DOCUMENTS

| | | | |
|---|---|---|---|
| 5,524,212 A | 6/1996 | Somani et al. | |
| 7,478,263 B1 | 1/2009 | Kownacki et al. | |
| 7,702,667 B2 * | 4/2010 | Yahalom | H04L 67/1095 707/611 |
| 9,430,343 B1 * | 8/2016 | Trachtman | G06F 11/1662 |
| 2007/0288247 A1 * | 12/2007 | Mackay | G06F 16/113 705/1.1 |
| 2012/0203888 A1 * | 8/2012 | Balakrishnan | G06F 9/505 709/224 |
| 2016/0364287 A1 | 12/2016 | Johri et al. | |
| 2017/0177611 A1 * | 6/2017 | Gowdappa | G06F 16/182 |
| 2017/0235755 A1 * | 8/2017 | Karampuri | G06F 16/1844 707/620 |

OTHER PUBLICATIONS

Muntimadugu et al., "Red Hat Cluster Storage 3.2 Administration Guide," Mar. 8, 2017, 465 pages.

(Continued)

*Primary Examiner* — Hosain T Alam
*Assistant Examiner* — Anthony G Gemignani
(74) *Attorney, Agent, or Firm* — Lowenstein Sandler LLP

(57) ABSTRACT

Systems and methods for using a thin arbiter node as a quorum decision maker in a distributed file system. An example method comprises receiving a write request with respect to a file, identifying a first data storage unit storing a first replica of the file and a second data storage unit storing a second replica of the file, determining that the first data storage unit is unavailable and that the second data storage unit is available, and in response to determining, using metadata residing on a thin arbiter node, that the second data storage unit contains at least on stale file replica, failing the write request to avoid split brain in the distributed file system.

15 Claims, 9 Drawing Sheets

(56) References Cited

OTHER PUBLICATIONS

Microsoft, Inc., "Understanding cluster and pool quorum," [retrieved from https://docs.microsoft.com/en-us/windows-server/storage/storage-spaces/understand-quorum], Feb. 22, 2018, 13 pages.
GitHub, "Two Site Stretch Cluster #281," [retrieved from https://github.com/gluster/glusterfs/issues/281], Jul. 25, 2017, 2 pages.
GitHub, "Thin arbiter quorum for 2-way replication #352," [retrieved from https://github.com/gluster/glusterfs/issues/352], Nov. 7, 2017, 4 pages.

* cited by examiner

Fig. 4
Operation 400
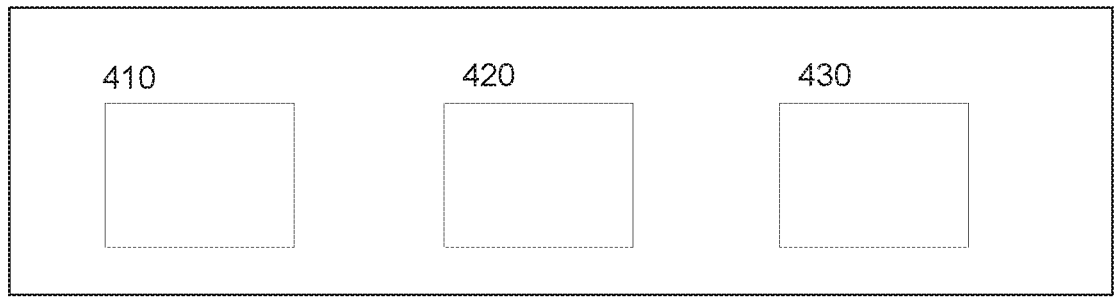
Operation 402
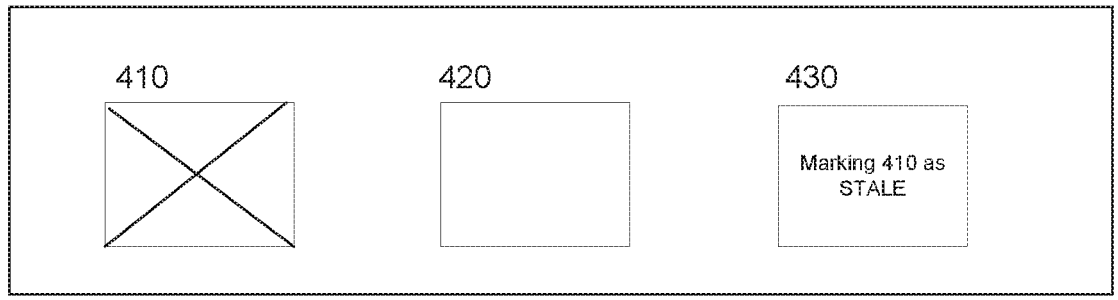
Operation 404
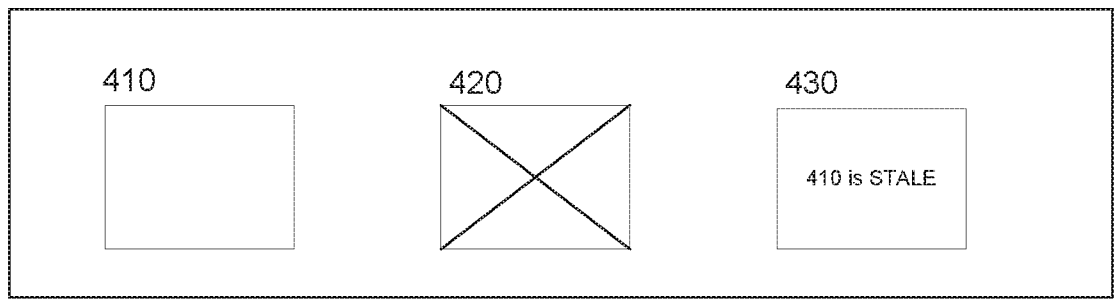
Operation 406
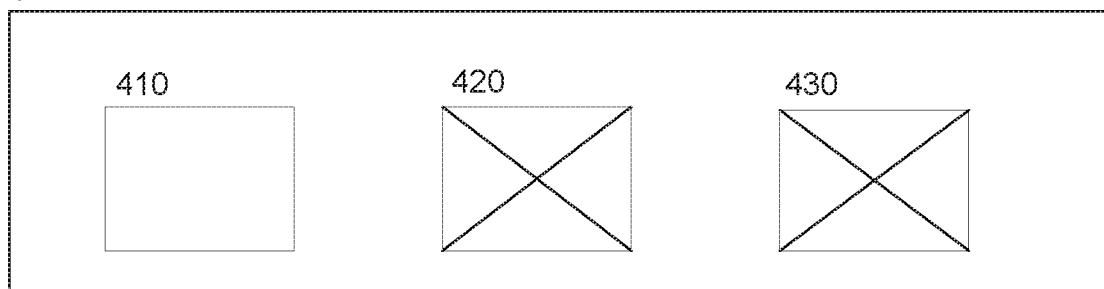

Fig. 5
Operation 550
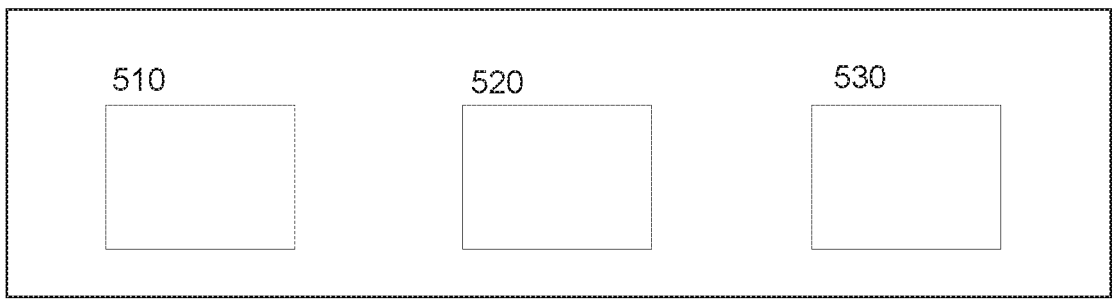
Operation 552
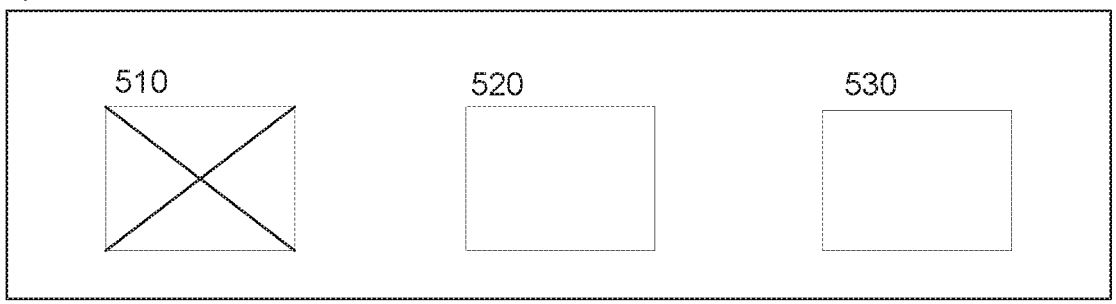
Operation 554
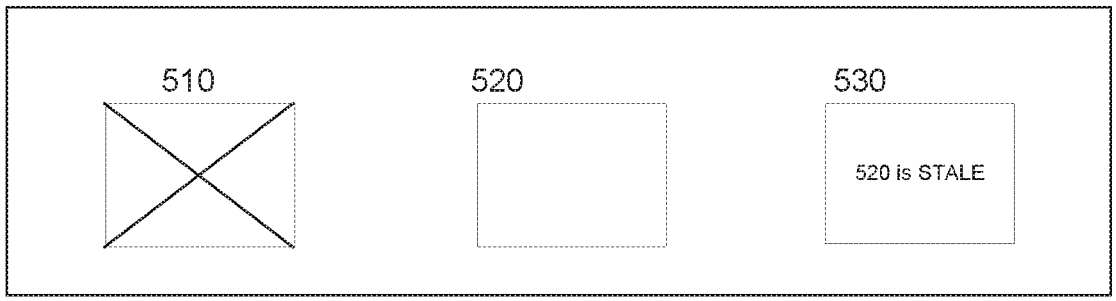

DISTRIBUTED FILE SYSTEM WITH THIN ARBITER NODE

TECHNICAL FIELD

The present disclosure is generally related to distributed file systems, and more particularly, to the replication of data in a distributed file system.

BACKGROUND

A distributed file system may replicate data across multiple nodes in order to improve the reliability and availability of the data to users of the distributed file system. The replication may allow a copy of the file to be accessed by a user of the distributed file system even if some of the nodes are unavailable.

BRIEF DESCRIPTION OF THE DRAWINGS

The present disclosure is illustrated by way of example, and not by way of limitation, and can be more fully understood with reference to the following detailed description when considered in connection with the figures in which:

FIG. 4 depicts a number of write operations occurring during a number of different states of two data storage units and a thin arbiter node.

FIG. 5 depicts a number of read operations occurring during a number of different states of two data storage units and a thin arbiter node.

DETAILED DESCRIPTION

Figure 1:
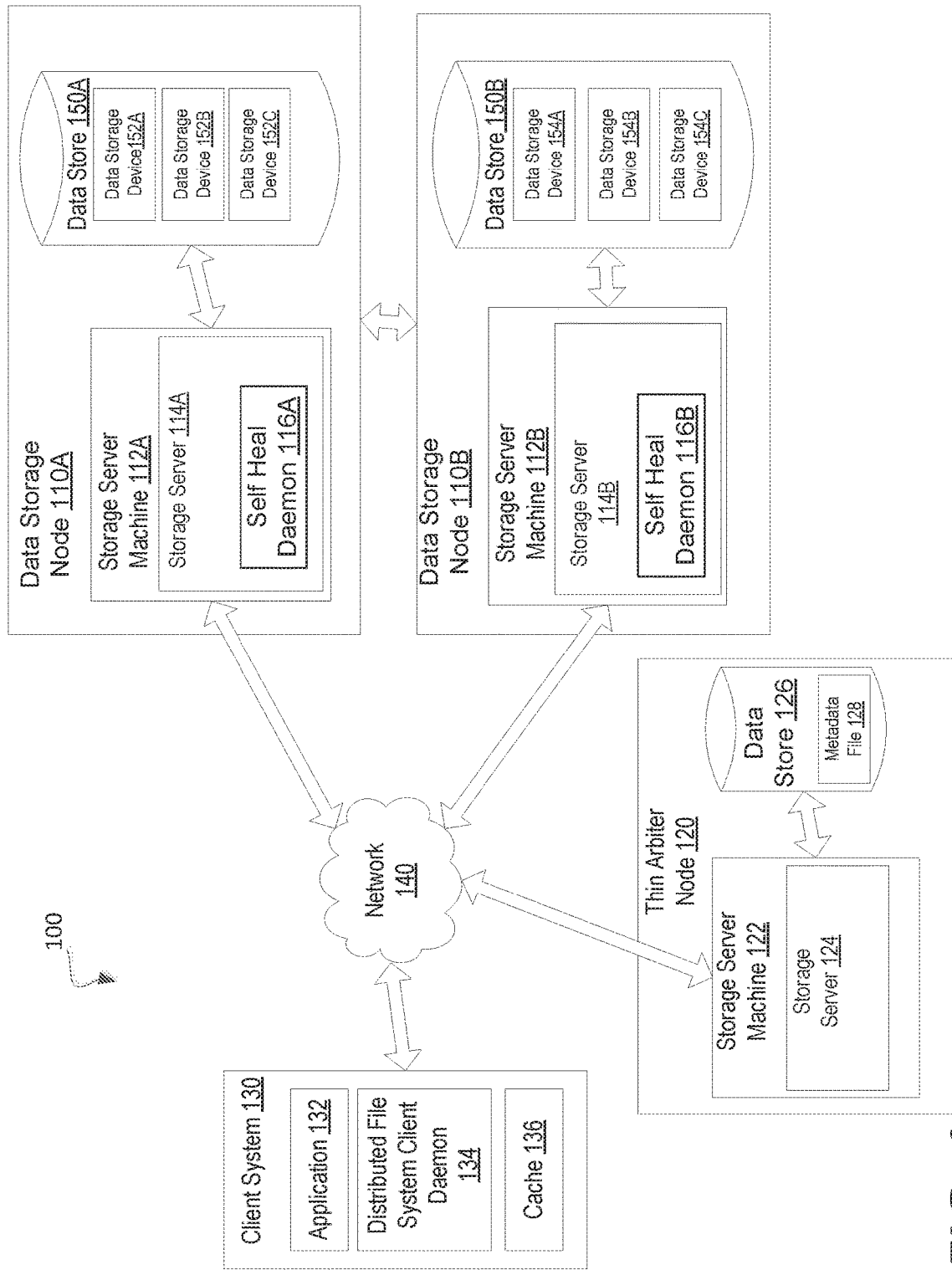
FIG. 1 depicts a high-level system diagram of an example distributed file system architecture, in accordance with one or more aspects of the present disclosure.

In a distributed file system (DFS), files may be replicated to two or more data storage devices located on two or more data storage nodes, which would involve storing replicas of a file by at least a subset of the data storage nodes. In some circumstances, one data storage device of a data storage node may be available while another data storage device of another data storage node may be unavailable when a write operation request is received. In such an instance, the write operation may only be performed on the available data storage device but not on the unavailable data storage device. Another write operation request may then be received before the second data storage node has an opportunity to heal the stale file. If the previously available data storage device becomes unavailable and the previously unavailable data storage device becomes available then the write operation may be performed on the previously unavailable data storage device. Thus, the first write operation would have been performed on the first data storage device, while the second write operation would have been performed on the second data storage device, thus leading to a "split-brain" condition, where the two file replicas are irreconcilable.

However, the problem of split-brain may be mitigated. In file systems using three-way replication to provide availability and consistency of data, each file may be replicated to three separate data storage nodes, which may reside at three separate physical locations (e.g., data centers). Accordingly, if at least two of the three data storage nodes are available, a requested file operation may succeed, otherwise the file operation would fail. However, replication of data files across three separate data centers can be very costly in terms of storage capacity and power utilization.

Aspects of the present disclosure relate to replication of data files to two data storage units to provide availability of data while using a third metadata-only node (referred herein as "thin arbiter") to provide consistency of data. A data storage unit may refer to a data storage node, a logical volume of storage, a data storage device, etc. A requested file operation may succeed if the two data storage units are available. When one data storage unit is available and the other data storage unit is unavailable, a write operation may succeed if the metadata stored by the thin arbiter node indicates that the available data storage unit is "current" (contains no "stale" file replicas). A file replica is "stale" if it does not reflect all operations performed on the file, and a file replica is "current" if it does reflect all operations that have been performed on the file. Otherwise, if the metadata stored by the thin arbiter node indicates that the available data storage unit is "stale" (contains at least one "stale" file replica) or if thin arbiter node is unavailable, the requested write operation would fail.

If the write operation is performed on the available data storage unit only, while the other data storage unit is unavailable, the metadata stored by the thin arbiter node may be updated to indicate that the unavailable data storage unit is "stale." The updated metadata would then be used to process future file operation requests to determine whether an available data storage unit is "current" or "stale" which would define the outcome of the requested operation.

As such, aspects of the present disclosure may improve the efficiency of distributed file systems by using a thin arbiter node to store metadata associated with data storage units of a distributed file system, in order to facilitate data replication of two copies of a file on two data storage units. Using thin arbiter node in a distributed file system may allow more efficient utilization of storage resources while providing data consistency and availability. Utilizing a thin arbiter node may reduce storage costs, including storage capacity and power consumption, by enabling a distributed file system to store consistent file replicas without the use of an additional data storage node. Using thin arbiter node may also result in faster performance than three-way replication because a file must only be written to two data storage nodes rather than three.

FIG. 1 depicts a high-level system diagram of an illustrative example of a distributed file system (DFS) 100, in accordance with one or more aspects of the present disclosure. It should be noted that other architectures for DFS 100 are possible, and that the implementation of a computer system utilizing examples of the invention are not necessarily limited to the specific architecture depicted.

The example DFS 100 shown in FIG. 1 may include one or more data storage nodes 110A-B, a thin arbiter node 120, and a client system 130, which may be interconnected by one or more networks 140. The data storage nodes 110A-B may each include a storage server 114A-B running on a storage server machine 112A-B and a data store 150A-B. Storage servers 114A-B may be represented by software modules employed for managing data stores 150A-B and communications to and from the network 140. Data stores 150A-B may each include one or more data storage devices 152A-C and 154A-C. The thin arbiter node 120 may include a storage server 124 running on a storage server machine 122 and a data store 126. Storage server 124 may be software for managing data store 126 and communications to and from the network 140. Data store 126 may include a metadata file 128 containing metadata associated with data storage devices 152A-C and 154A-C. Client system 130 may include an application 132, a DFS client daemon 134 for data replication in the DFS using thin arbiter node, and a cache 136. In an illustrative example, the DFS client daemon 134 may be implemented as a user-space application residing on the client system 130. Alternatively, DFS client daemon 134 may be implemented as a userspace process running on any machine connected to the DFS 100.

Storage server machines 112A-B and 122 may include any data processing device, such as a desktop computer, a laptop computer, a mainframe computer, a personal digital assistant, a server computer, a handheld device or any other device configured to process data. Data storage devices 152A-C and 154A-C may include magnetic or optical based storage disks, solid-state drives (SSDs), hard drives, or any other physical data storage device.

Data storage nodes 110A-B may be used to store one or more file replicas in the DFS. For example, one replica of a file may be stored on data storage device 152A of data store 150A while another replica of the file may be stored on data storage device 154A of data store 150B. Self-heal daemon 116A-B, as will be described in more detail herein below, may be used to heal a "stale" storage device. Self-heal daemon 116A-B may also be used to invalidate cached metadata stored in the cache 136 of the client system 130 and update the metadata of metadata file 120 stored on thin arbiter node 120. Although the self-heal daemon 116A-B are depicted as residing on storage servers 114A-B, the self-heal daemon may be implemented on any machine associated with the DFS.

Thin arbiter node 120 may store a metadata file 128 that contains metadata associated with the data storage devices 152A-C and 154A-C of data stores 150A-B. While FIG. 1 only illustrates two data stores 150A and 150B, the systems and methods of the present disclosure may be applicable to any number of data stores 150.

Within the metadata file 128 there may be a plurality of entries, such that each entry would correspond to a set of data storage devices replicated over two or more data storage nodes. Each entry of the metadata file 128 may indicate whether one of the data storage devices of a particular replica set is "stale" (i.e., contains one or more "stale" files). For example, the metadata may include an entry indicating whether data storage device 152A or 154A is "stale," wherein data storage devices 152A and 154A form a replica set.

Thin arbiter node 120 may be reside on a cloud service platform, on a device of the DFS, or any other device connected to the network 140. Thin arbiter node 120 may be connected to data storage nodes 110A-B and client system 130 through a high latency network connection or a low latency network connection. A high latency connection to the thin arbiter node 120 may be tolerated because the metadata of metadata file 128 may be at least partially cached in a cache 136 residing on the client system 130. The DFS client daemon 134 may use the cached metadata without retrieving the metadata from the thin arbiter node, as described in more detail herein below.

Client system 130 may host one or more applications 132. An application 132 may be any type of application such as a web application, a desktop application, a browser application, etc. An application 132 may request access to the data in the DFS 100. For example, the application 132 may request to read or write files stored in the DFS 100. Client system 130 may include a DFS client daemon 134 for communicating with data storage nodes 110A-B and thin arbiter node to facilitate file replication. Client system 130 may also include a cache 136 for storing metadata retrieved from metadata file 128 associated with the storage devices 152A-C and 154A-C. In one example, cache 136 may store metadata retrieved from the metadata file 128 on data store 126. Cache 136 may be used to determine whether the first or second data storage devices contain a "stale" file without retrieving the metadata stored by the thin arbiter node 120.

Client system 130 may store metadata comprising topology information of the DFS 100 (e.g., the number of data storage nodes and data storage devices, data storage node and data storage device connection information, replication relationships between data storage nodes and data storage devices, file allocation to data storage nodes and data storage devices, etc.). In an illustrative example, the topology information may be represented by a configuration graph which may be provided by a tree-like data structure comprising a root node corresponding to the file system mount point, two or more terminal ("leaf") nodes corresponding to the storage nodes, and two or more intermediate nodes referred to as "translators." The translators may process file system operation requests and responses traversing the graph. The client 130 may employ the configuration graph to process file access requests issued by applications executed by the client computer system. Each file access request may traverse the graph from the mount point to one or more leaf nodes via one or more translators. Responses corresponding to the file access requests may traverse the graph following the reverse route. In an illustrative example, a replication translator may receive a write request from its parent node and perform corresponding write operations on two or more of its child nodes.

When a request to perform an operation on a file is received, DFS client daemon 134 may use the topology information to identify the replica set associated with the file on which the requested operation is to be performed. The replica set may identify the data storage nodes and data storage devices storing the file. The DFS client daemon 134 may then determine whether the identified data storage devices are available. The DFS client daemon 134 may retrieve the metadata associated with the identified replica set from the corresponding entry in the metadata file 128 in order to determine whether one of the data storage devices of the replica set is "stale."

Network 140 may be a public network (e.g. the internet), a private network (e.g. a local area network (LAN) or a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
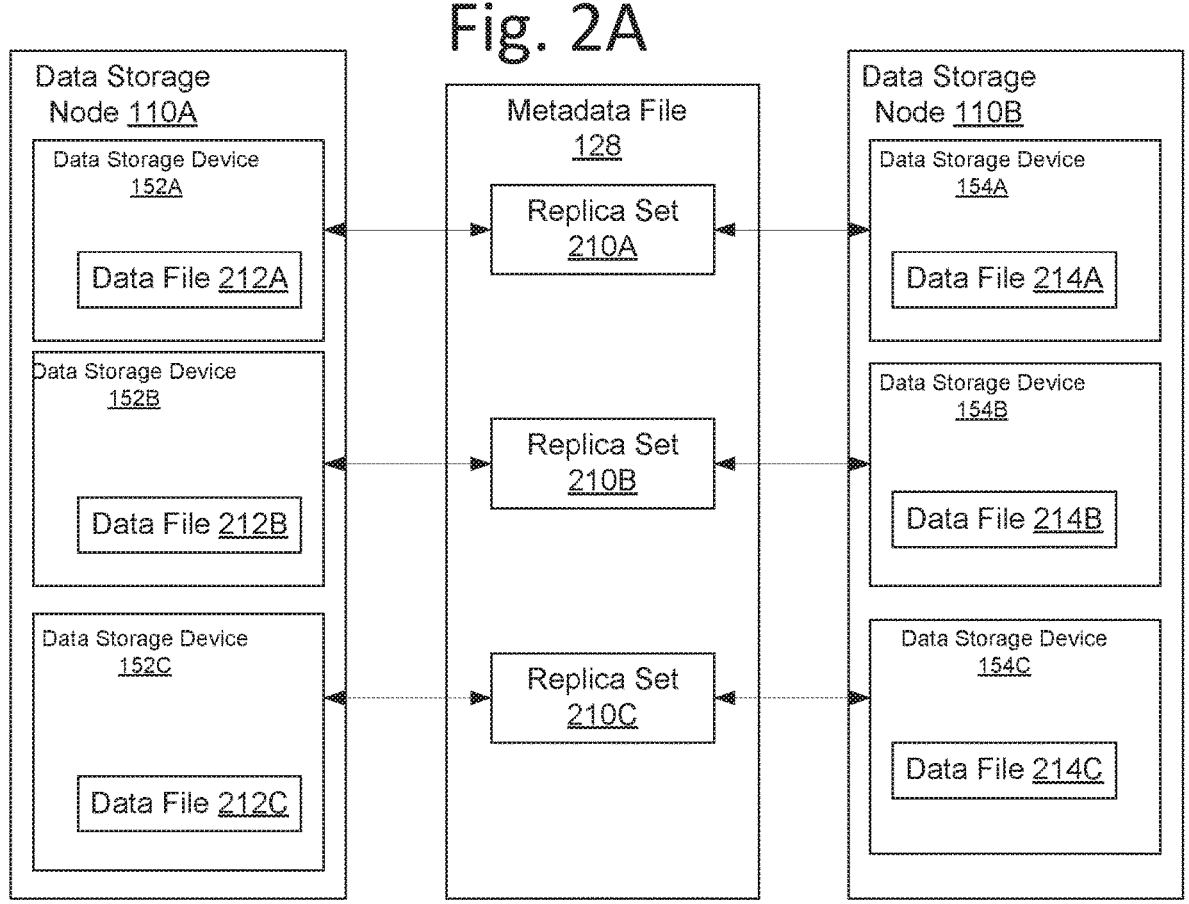
FIG. 2A depicts a block diagram of two data storage nodes and the grouping of data storage devices into replica-sets.
FIG. 2B depicts a table representing an example of a metadata file with entries corresponding to the status of data storage device replica sets.

FIG. 2A depicts a block diagram representing replica sets in a metadata file 128 and the associated data storage devices 152A-C and 154A-C residing on data storage nodes 110A-B, in accordance with one or more aspects of the present disclosure. A replica set may be a set of data storage devices between which data files are replicated such that both data storage devices contain the same data (e.g., the same set of files). Replica sets may be defined by the topology information metadata stored on the client system 130. The data storage devices of a replica set may reside on different data storage nodes. As an example, FIG. 2A shows data storage nodes 110A-B, and a metadata file 128. Data storage node 110A may include one or more data storage devices 152A-C, from FIG. 1, and data storage node 110B may include one or more data storage devices 154A-C, from FIG. 1. Metadata file 128 may contain entries of metadata associated with one or more replica sets 210A-C each corresponding to a first data storage device provided by data storage node 110A and a second data storage device provided by data storage node 110B. The metadata entry associated with a replica set may indicate whether the first or second data storage devices of that replica set contain "stale" file replicas.

In one example, the entry associated with replica set 210A may comprise metadata associated with data storage device 152A residing on data storage node 110A and data storage device 154A residing on data storage node 110B. In the same or different example, the entry for replica set 210B may comprise metadata associated with data storage devices 152B and 154B, and the entry for replica set 210C may comprise metadata associated with data storage device 152C and 154C.

Data storage nodes may store metadata indicating the status of a data storage device residing on the other data storage node. For example, data storage node 110A may store metadata indicating whether data storage device 154A contains one or more "stale" file replicas. Data storage node 110B may in turn store an indicator of whether data storage device 152A contains one or more "stale" files. Thus, during a read or write operation in which both data storage nodes 110A and 110B are available, DFS client daemon 134 may be able to identify whether either data storage device 152A or 154A contain one or more "stale" files without retrieving the metadata stored by the thin arbiter node 120.

FIG. 2B depicts a table representing an illustrative metadata file 128 with three entries corresponding to three replica sets. As an example, FIG. 2B depicts three metadata entries corresponding to replica sets 210A-C. Each of the entries includes metadata items indicating whether the corresponding data storage device associated with each replica set contains one or more "stale" file replicas. As an example, in FIG. 2B, an entry of "current" for a data storage device may indicate that the data storage device does not contain any "stale" file replicas and an entry of "stale" may indicate that the data storage device contains at least one "stale" file replica that needs to be healed. A data storage device may become "stale" when a write operation succeeds on one data storage device of a replica set but not the other. For example, if data storage device 152A is available and 154A is unavailable when a write request is received, then the write operation may succeed on data storage device 152A but not on 154A and thus the file on 152A may contain a "current" file replica while 154A may contain a file replica that is "stale" (i.e. inconsistent with the "current" file).

An application 132 may request to write to a file stored in the data storage devices of a replica set. If both data storage devices of the replica set to which the write is to be performed are "current" then the requested write operation is performed on both data storage devices. For example, application 132 of client system 130 may request to write to a file in the DFS 100. The data storage nodes and the data storage devices on which the file resides may be identified by consulting topology information stored on the client system 130. The data storage devices on which the file resides may form a replica set and the topology information may associate the replica set with an entry in the metadata file 128. As such, the DFS client daemon 134 may identify the entry in the metadata file 128 by consulting the topology information associated with that replica set.

For example, as shown in FIG. 2B, an entry for replica set 210A corresponding to data storage devices 152A and 154A may indicate that both device 152A and 154A are "current" (e.g. do not contain "stale" files). The DFS client daemon 134 may then perform the write operation on the first replica of the file stored on data storage device 152A and the second replica of the file stored on data storage device 154A.

If one of the data storage nodes 110A-110B is unavailable while the other data storage node remains available, the metadata stored by the thin arbiter node may be retrieved by the DFS client daemon 134 to determine whether the write operation may be performed. After the metadata is retrieved, it may be cached locally in cache 136 of client system 130. Thus, DFS client daemon 134 may retrieve the metadata from the local cache 136 when subsequent write operation requests are received, until the cache 136 is invalidated, as described in more detail herein below.

For example, an entry in metadata file 128 for replica set 210B may comprise metadata items corresponding to data storage devices 152B and 154B. The metadata items may indicate that device 152B is "current" (e.g. does not contain a "stale" file replica) and that device 154B is "stale" (e.g. contains at least one "stale" file replica). In operation, DFS client daemon 134 may retrieve the metadata file entry corresponding to the replica set on which the file identified by the file operation request resides. Using the metadata, DFS client daemon 134 may determine that data storage device 154B residing on data storage node 110B contains at least one "stale" file replica and that data storage device 152B residing on data storage node 110A contains no "stale" file replicas. If DFS client daemon 134 determines that data storage node 110B is unavailable and 110A is unavailable, then the DFS client daemon 134 may fail the write request.

In another example, an entry in metadata file 128 for replica set 210C may comprise metadata items corresponding to data storage devices 152C and 154C. The metadata items may indicate that data storage device 152C is "stale" (e.g. contains at least one "stale" file replica) and that data storage device 154C is "current" (e.g. does not contain a "stale" file replica). In operation, DFS client daemon 134 may retrieve the metadata file entry corresponding to the replica set on which the file identified by the file operation request resides. Using the metadata, DFS client daemon 134 may determine that data storage device 152C residing on data storage node 110A contains at least one "stale" file replica and that data storage device 154C residing on data storage node 110B contains no "stale" file replicas. If DFS client daemon 134 determines that data storage node 110A is unavailable and 110B is available, then the DFS client daemon 134 may perform the write operation on the available and "current" data storage device 154C.

In one example, data storage node 110A may store metadata items indicating the status of each data storage device 154A-C of data storage node 110B and data storage node 110B may store metadata indicating the status of each data storage device 152A-C of data storage node 110A. Therefore, when both data storage nodes are available when a requested operation is received DFS client daemon 134 does not contact thin arbiter node 120. Rather, DFS client daemon 134 may determine which, if either, data storage device is "stale" by retrieving the metadata stored on data storage nodes 110A-B indicating the status of the data storage devices residing on the other data storage node.

The above descriptions of FIGS. 1, 2A, and 2B refer to replication across data storage devices residing on data storage nodes. The descriptions also describe the metadata stored on thin arbiter node as being associated with replica sets of data storage devices. However, it should be noted that, more generally, data may be replicated across data storage units. A data storage unit may be a data storage node, a data storage device, a logical volume of storage, etc. Similarly, the metadata stored on the thin arbiter node may be associated with data storage units and a replica set may refer to a set of data storage units between which data is replicated. Therefore, all descriptions above may apply to data storage units generally.

Figure 3:
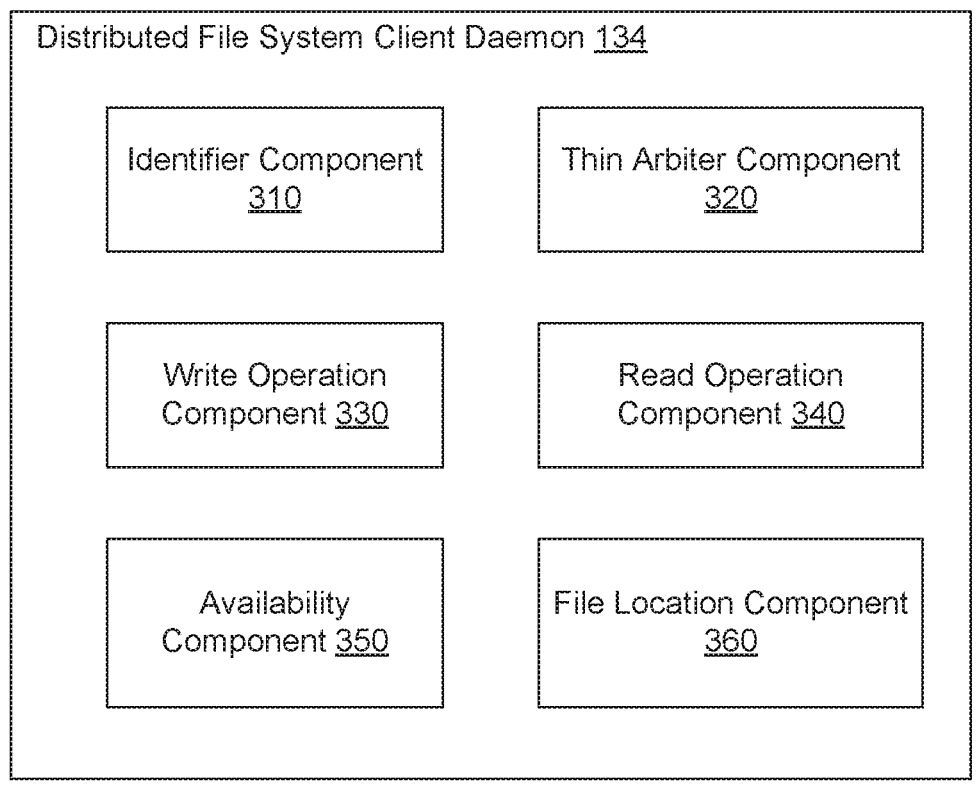
FIG. 3 depicts a component diagram of an example distributed file system daemon.

FIG. 3 is a block diagram illustrating example components of an example DFS client daemon 134. DFS client daemon 134 may comprise an identifier component 310 for identifying the data storage unit, data storage device, or data storage node on which a file resides, a thin arbiter component 320 for contacting and sending updates to the metadata on thin arbiter node, a write operation component 330 for receiving a write request and determining if and on which data storage device the write operation requested should be performed, a read operation component 340 for receiving a read request and determining if and which data storage device the read operation should be performed, an availability component 350 that may determine if the data storage nodes or data storage devices are available to the DFS client daemon 134, and a file location module 360 that may determine the location of files on which a received operation is to be performed.

FIG. 4 is an example of a series of write operations illustrating example states of the DFS. In operation 400, when a write transaction is received and both data storage devices 410 and 420 are available and thin arbiter node 430 is available then the write operation may succeed to both data storage devices and thin arbiter node is not contacted.

In operation 402, while both data storage units are "current," a write operation request may be received while data storage unit 420 is unavailable and data storage unit 410 is available. The write operation may then be performed on storage unit 410 but not on data storage unit 420. To mark the operation as a success, the DFS client daemon 134 may determine that the thin arbiter node 430 is available and that the complete storage unit 410 is a "current" copy. DFS client daemon 134 may then update the metadata stored by the thin arbiter node 430 to indicate that data storage node 420 stores at least one "stale" file replica. Once the metadata has been updated successfully, then DFS client daemon 134 may determine that the write operation was successful. The DFS client daemon may then cache the metadata locally on the client system.

In operation 404, the metadata stored by the thin arbiter node 430, and cached locally on the client system, may indicate that data storage unit 410 is "stale." DFS client daemon 134 may attempt to update the metadata stored by the thin arbiter node 430 to indicate that data storage unit 420 contains a "stale" replica file. The attempt to update the metadata to indicate that data storage unit 420 contains a "stale" file replica may be rejected, and the operation failed, in order to prevent a split-brain pattern. The metadata stored by the thin arbiter node may indicate that one of the data storage units is the "current" data storage unit. All requested operations for which the "current" data storage unit is available may succeed on that data storage unit and all requested operations for which that data storage unit is unavailable may fail. If the metadata cached locally on the client system indicates that data storage unit 420 contains a "stale" replica file then the operation may fail without contacting thin arbiter node 430.

In operation 406, when DFS client daemon 134 attempts to update the metadata stored by the thin arbiter node 430 but the thin arbiter node 430 is unavailable the operation may fail because DFS client daemon 134 may be unable to update the metadata stored by the thin arbiter node.

FIG. 5 is an illustrated example of read operations illustrating example states of the DFS. In operation 550 when a read operation request is received and all the data storage units are available, the request may go to data storage unit 510 and data storage unit 520 based on load-balancing. The read request may not need to retrieve the metadata stored by the thin arbiter node 530 because each data storage unit may store metadata indicating if the other data storage unit is "stale." Therefore, when both data storage units 510 and 520 are available it may be determined which data storage unit is "current." Similarly, if just the two data storage units 510 and 520 are available then the daemon may be able to determine which data storage unit is "current" by retrieving the metadata stored on the data storage units 510 and 520.

In operation 552 if one data storage unit 510 is down while thin arbiter node 530 and the other data storage unit 520 are available then the DFS client daemon 134 may retrieve the metadata stored by the thin arbiter node to determine which data storage unit is "stale." If as in operation 552, the metadata stored by the thin arbiter node 530 does not indicate that the available data storage unit 520 is "stale" then the read operation may succeed. Additionally, if the metadata stored on the available data storage unit 520 indicates that the other data storage unit 510 contains a "stale" file replica then the read operation may retrieve the requested file from the available data storage unit 520. In such a situation, the operation may succeed without contacting thin arbiter node 530.

Otherwise, if as in operation 554 the metadata stored by the thin arbiter node 530, or the metadata cached locally on the client system, indicates that the available data storage unit 520 is "stale" then the operation may be failed. If the metadata is cached locally on the client system then the operation may fail without contacting thin arbiter node 530.

When a data storage unit is unavailable it is inhibitive to continue to retrieve the metadata stored by the thin arbiter node 120 for each operation because the latency may be very high causing a slowdown of the application 132. Therefore, the first time the DFS client daemon 134 encounters a failed write operation and receives the metadata indicating which data storage unit is "current" and which is "stale" it stores this metadata in a cache 136 on the client system 130. From that time forward, until a heal operation may be performed on the "stale" file, the DFS client daemon 134 does not have to retrieve the metadata stored by the thin arbiter node 120 again. When all data storage units and the thin arbiter node are available again, self-heal daemon 116A or 116B may then heal the "stale" data storage unit by copying the current file replicas from a current data storage unit and update the metadata stored by the thin arbiter node 120 at which time the self-heal daemon 116A or 116B may notify the client system 130 to invalidate the cache 136.

The "current" data storage unit may store an index of files that need healing. The index of files may be determined based on the files written to while the "stale" data storage unit was unavailable. Self-heal daemon 116A or 116B may read the index to repair the "stale" data storage unit. When all data storage units are "current," self-heal daemon 116A or 116B may send a cache invalidation command to the client system 130. Once the client system 130 has invalidated the cache 136 in response to receiving the cache invalidation command, self-heal daemon 116A or 116B may lock the metadata file stored by the thin arbiter node 120 and update the metadata file to indicate that the previously "stale" data storage unit is "current" again.

Figure 6:
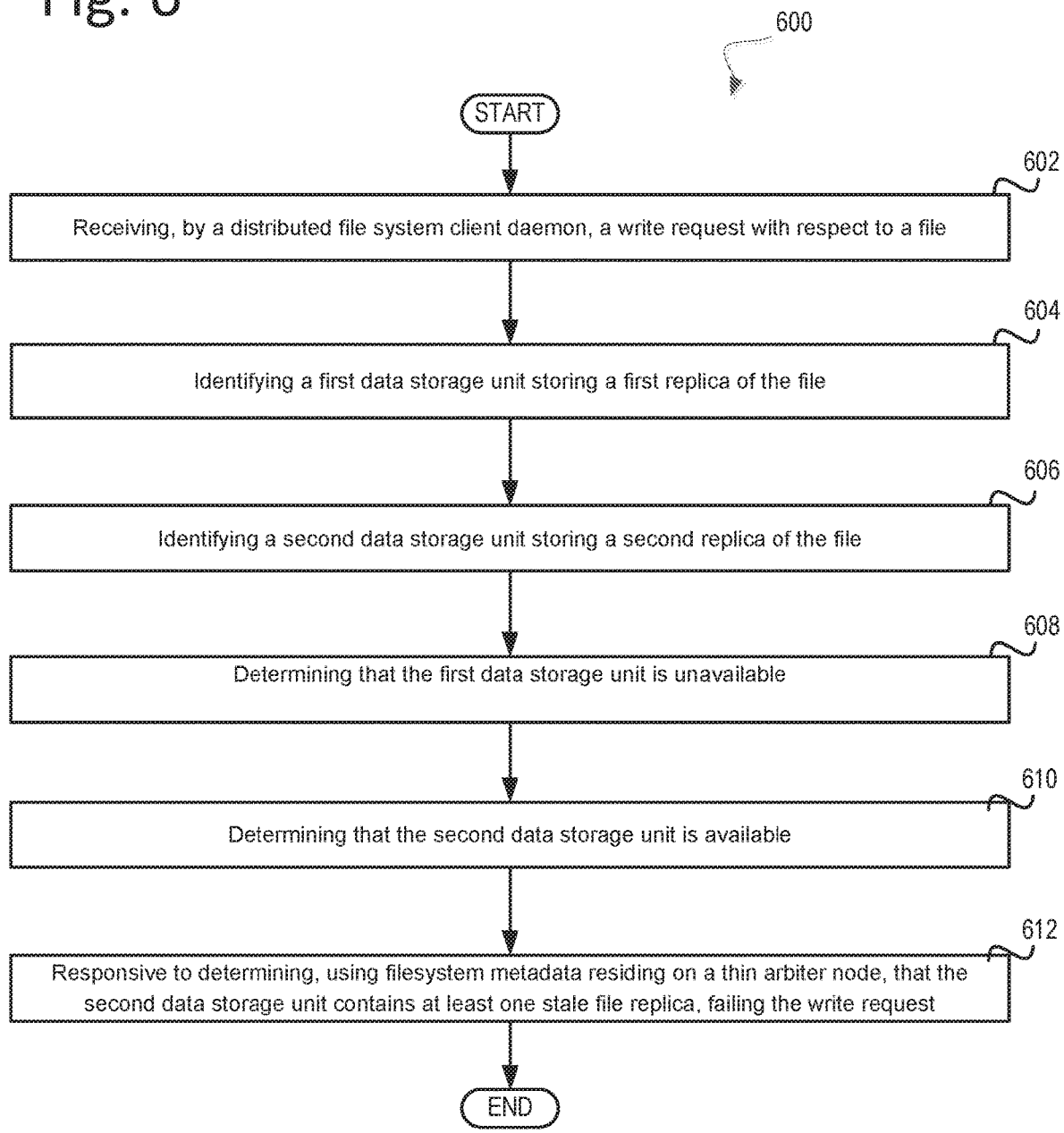
FIG. 6 depicts a flow diagram of an example method for using a thin arbiter node during a write process as a quorum decision maker for replication based storage.
Figure 7:
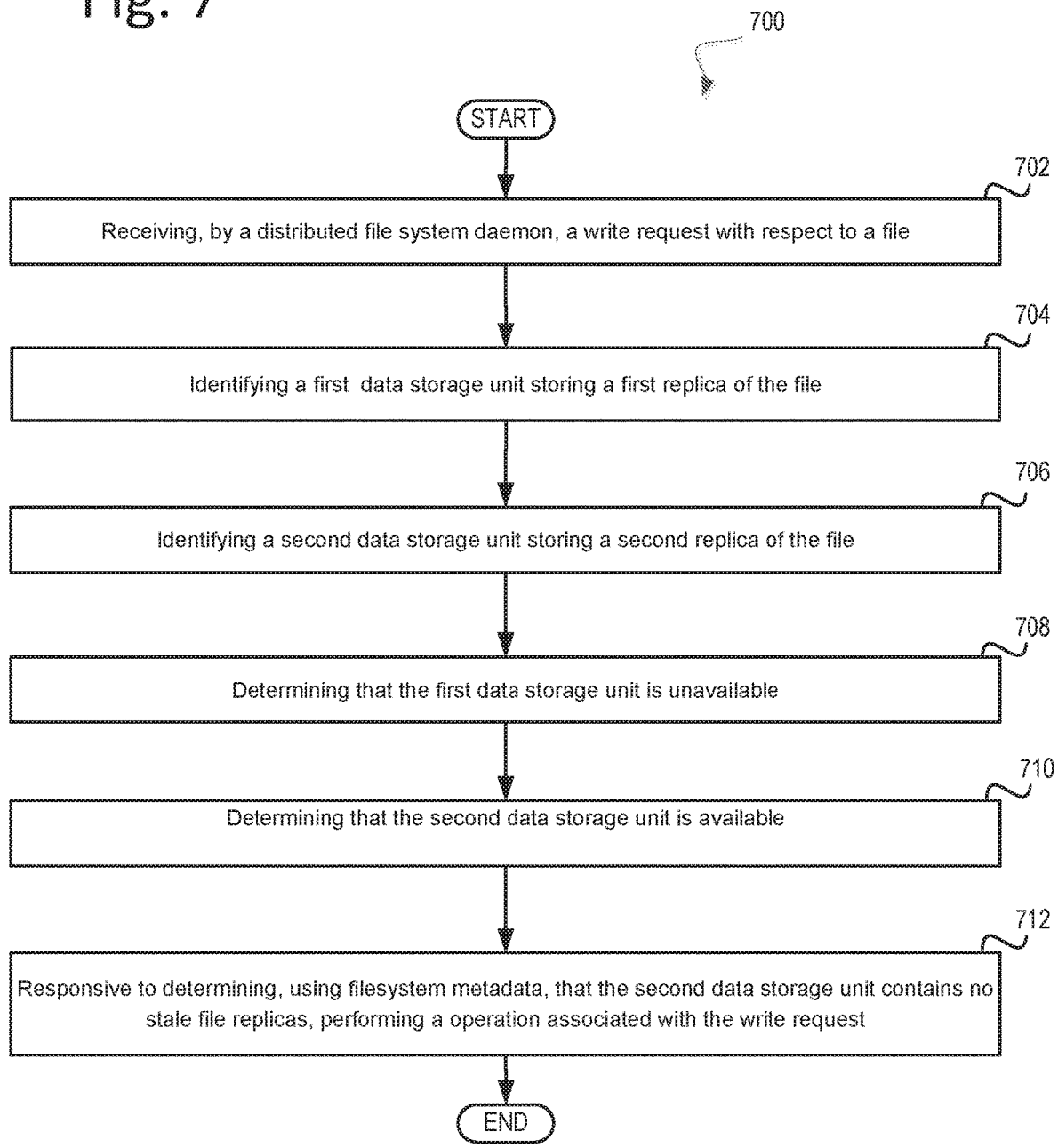
FIG. 7 depicts a flow diagram of an example method for using a thin arbiter node to allow a write request operation to be performed when a data storage unit is unavailable.
Figure 8:
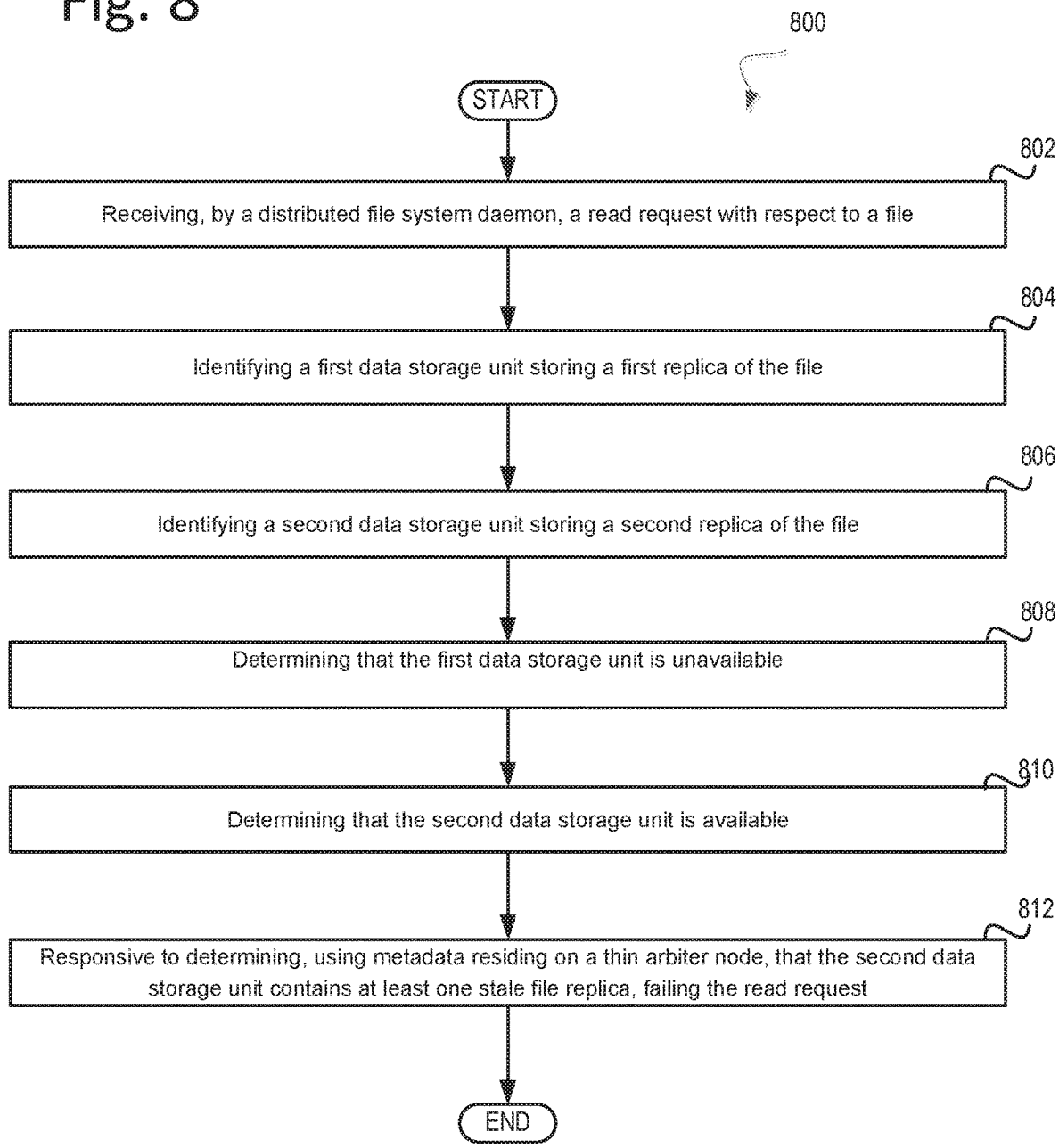
FIG. 8 depicts a flow diagram of an example method for using a thin arbiter node as a quorum decision maker during a read operation.

FIGS. 6, 7, and 8 depict flow diagrams for illustrative examples of methods 600, 700 and 800 for using thin arbiter node to avoid split-brain during file replication across data storage units. Method 600 illustrates an example process flow when using a thin arbiter node to avoid split brain during a write operation. Method 700 illustrates an example process flow using a thin arbiter node for a successful write operation. Method 800 illustrates an example process flow to fail a read operation when a "current" data storage unit is unavailable. Methods 600, 700, and 800 may be performed by processing logic that may comprise hardware (e.g., processing device, circuitry, dedicated logic, programmable logic, microcode, etc.), software (e.g., instructions run or executed on a processing device), or a combination thereof. In some embodiments, methods 600, 700, and 800 may be performed by a DFS client daemon 134 of FIG. 1.

For simplicity of explanation, the methods of this disclosure are depicted and described in a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, the methods disclosed in this specification are capable of being stored on an article of manufacture to facilitate transporting and transferring such methods to computing devices. The term "article of manufacture," as used herein, is intended to encompass a computer program accessible from any computer-readable storage device or memory page media.

Referring to FIG. 6, method 600 may be performed by processing devices of a server and/or a client system. At block 602, DFS client daemon may receive a write request with respect to a file. A replica of the file may be stored on both a first and a second data storage unit of a DFS.

At block 604, the DFS client daemon may identify a first data storage unit storing a first replica of the file and at block 606 the DFS client daemon may identify a second data storage unit storing a second replica of the file. The first data storage unit may be a first physical storage device residing on a first data storage node and the second data storage unit may be a second physical storage device residing on a second data storage node. The first and second data storage units may be a replica set, in which both data storage units store the same data. For example, all write operations performed on the first data storage unit of a replica set may also be performed on the second data storage unit of the replica set. Therefore, the first and second data storage units of the replica set may each store replicas of the same files.

At block 608, the DFS client daemon may determine that the first data storage unit is unavailable. The data storage unit may be determined to be unavailable if the data storage unit has gone offline, if there is a faulty connection, or for any other reason the client system 130 may be unable to contact the data storage unit. At block 610, the DFS client daemon may determine that the second data storage unit is available. The data storage unit may be available when a connection to the data storage unit may be established and DFS client daemon is able to communicate with the data storage unit.

At block 612, the DFS client daemon may fail the write request in response to determining that the second data storage unit (the available data storage unit) contains at least one "stale" file replica. The DFS client daemon may determine that the second data storage unit contains at least one "stale" file replica using metadata residing on the thin arbiter node, or metadata cached locally on the client system. The metadata residing on the thin arbiter node may include one or more entries each corresponding to a data replica set. Each entry may include metadata indicating whether the first data storage unit of the replica set contains one or more "stale" file replicas and whether the second data storage unit of the replica set contains one or more "stale" file replicas. Failing a write operation when the available data storage unit contains one or more "stale" file replicas may prevent a split-brain condition.

Referring to FIG. 7, method 700 may be performed by processing devices of a server and/or a client device. At block 702, DFS client daemon may receive a write request with respect to a file. A replica of the file may be stored on both a first and a second data storage unit of a DFS.

At block 704, the DFS client daemon may identify a first data storage unit storing a first replica of the file and at block 706 the DFS client daemon may identify a second data storage unit storing a second replica of the file. The first data storage unit may be a first physical storage device residing on a first data storage node and the second data storage unit may be a second physical storage device residing on a second data storage node. The first and second data storage units may be a replica set, in which both data storage units store the same data. For example, all write operations performed on the first data storage unit of a replica set may also be performed on the second data storage unit of the replica set. Therefore, the first and second data storage units of the replica set may each store replicas of the same files.

At block 708, the DFS client daemon may determine that the first data storage unit is unavailable. The data storage unit may be determined to be unavailable if the data storage unit has gone offline, there is a faulty connection, or for any other reason the client system 130 may be unable to contact the data storage unit. At block 710, the DFS client daemon may determine that the second data storage unit is available. The data storage unit may be available when a connection to the data storage unit may be made and DFS client daemon is able to communicate with the data storage unit.

At block 712, the DFS client daemon may perform the write request operation in response to determining that the second data storage unit (the available data storage unit) does not contain any "stale" file replicas. DFS client daemon may determine that the second data storage unit does not contain any "stale" file replicas using metadata residing on the thin arbiter node, or metadata cached locally on the client system. The metadata residing on the thin arbiter node, or cached on the client system, may include one or more entries each corresponding to a data replica set. Each entry may include metadata indicating whether the first data storage unit of the replica set contains one or more "stale" file replicas and whether the second data storage unit of the replica set contains one or more "stale" file replicas.

Referring to FIG. 8, method 800 may be performed by processing devices of a server and/or a client system. At block 802, DFS client daemon may receive a read request with respect to a file. A replica of the file may be stored on both a first and a second data storage unit of a DFS.

At block 804, the DFS client daemon may identify a first data storage unit storing a first replica of the file. At block 806, the DFS client daemon may identify a second data storage unit storing a second replica of the file. The first data storage unit may be a first physical storage device residing on a first data storage node and the second data storage unit may be a second physical storage device residing on a second data storage node. The first and second data storage units may be a replica set, in which both data storage units store the same data. For example, all write operations performed on the first data storage unit of a replica set may also be performed on the second data storage unit of the replica set. Therefore, the first and second data storage units of the replica set may each store replicas of the same files.

At block 808, the DFS client daemon may determine that the first data storage unit is unavailable. The data storage unit may be determined to be unavailable when a connection to the data storage unit cannot be established because the data storage unit has gone offline, there is a faulty connection, or any other reason the client system 130 may be unable to contact the data storage unit. At block 810, the DFS client daemon may determine that the second data storage unit is available. The data storage unit may be available when a connection to the data storage unit may be made and DFS client daemon is able to communicate with the data storage unit.

At block 812, the DFS client daemon may fail the read request in response to determining that the second data storage unit (the available data storage unit) contains at least one "stale" file replica. DFS client daemon may determine that the second data storage unit contains at least one "stale" file replica using metadata residing on the thin arbiter node, or metadata cached locally on the client system. The metadata residing on the thin arbiter node, or cached on the client system, may include one or more entries each corresponding to a data replica set. Each entry may include metadata indicating whether the first data storage unit of the replica set contains one or more "stale" files and whether the second data storage unit of the replica set contains one or more "stale" files. Failing the read operation may prevent the read request from returning "stale" data.

Figure 9:
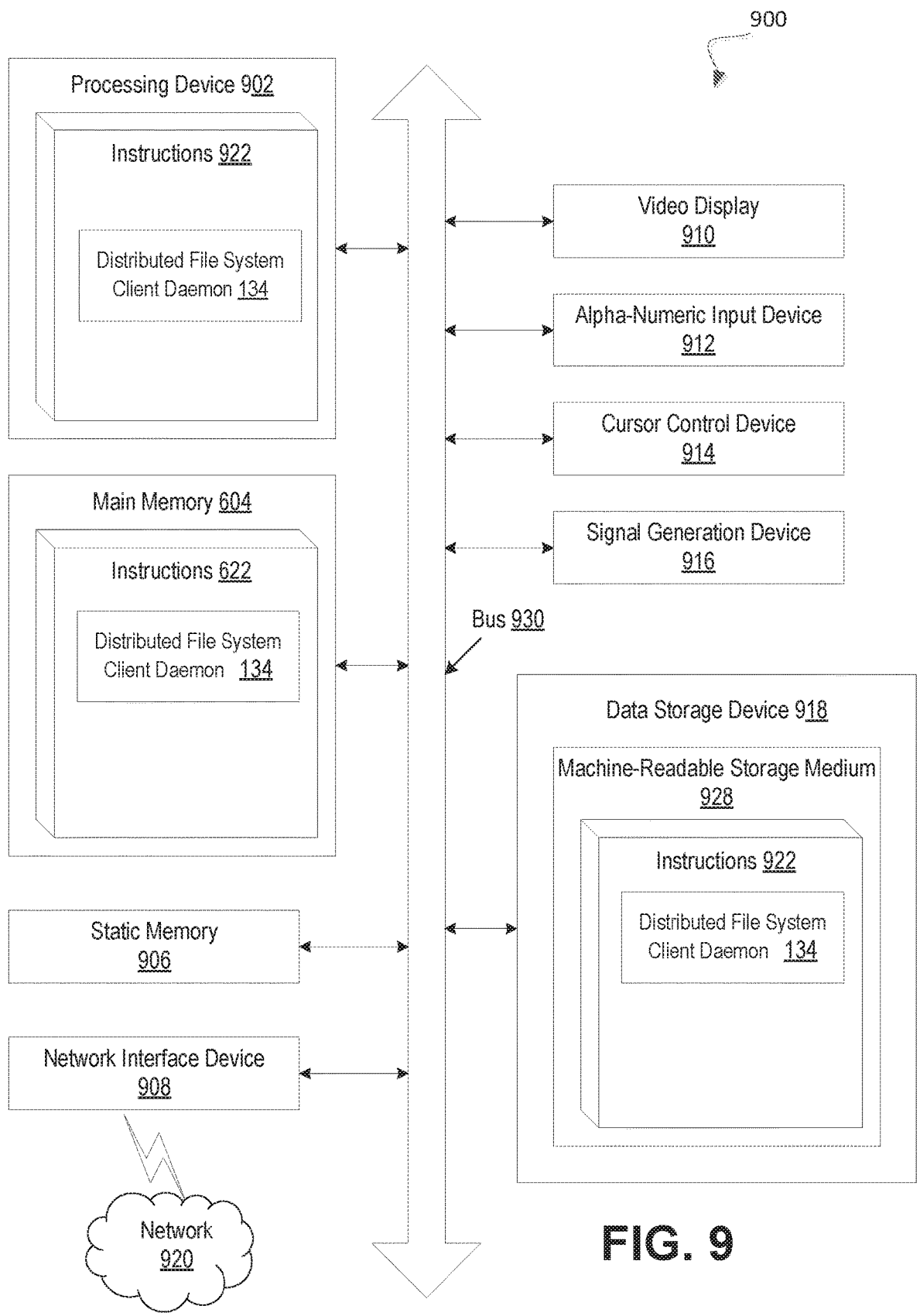
FIG. 9 depicts a block diagram of an illustrative computer system operating in accordance with examples of the invention.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a data storage device 918, which communicate with each other via a bus 930. The processing device 902 may be operatively coupled with the main memory 904, static memory 906, and/or the data storage device 918.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may execute instructions 922 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928 (also known as a computer-readable medium) on which is stored one or more sets of instructions or software 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting machine-readable storage media.

In one implementation, the instructions 922 include instructions for a DFS client daemon (e.g., DFS client daemon 134 of FIG. 1) and/or a software library containing methods that call a DFS client daemon. While the machine-readable storage medium 928 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Other computer system designs and configurations may also be suitable to implement the system and methods described herein. The following examples illustrate various implementations in accordance with one or more aspects of the present disclosure.

Example 1 is a method comprising: receiving, by a DFS client daemon, a write request with respect to a file; identifying a first data storage unit storing a first replica of the file; identifying a second data storage unit storing a second replica of the file; determining that the first data storage unit is unavailable; determining that the second data storage unit is available; responsive to determining, using metadata residing on a thin arbiter node, that the second data storage unit contains at least one stale file replica, failing the write request.

Example 2 is the method of example 1 further comprising: responsive to determining that the second data storage unit contains no stale file replicas, performing, on the second replica of the file, a write operation specified by the write request.

Example 3 is the method of example 1 wherein the first data storage unit is provided by a first data storage node and wherein the second data storage unit is provided by a second data storage node.

Example 4 is the method of example 1 wherein the first data storage unit is provided by a first physical storage device residing on a first data storage node and wherein the second data storage unit is provided by a second physical storage device residing on a second data storage node.

Example 5 includes the subject matter of claim 1 wherein the metadata residing on thin arbiter node corresponds to a replica set comprising the first data storage unit and the second data storage unit.

Example 6 is the method of example 1 further comprising: caching the metadata in a local memory of a client system.

Example 7 is the method of example 6 further comprising: responsive to determining, using the cached metadata in the local memory of the client system, that the second data storage unit contains at least one stale file replica, failing the write request.

Example 8 is the method of example 7 further comprising: receiving, from a self-heal daemon, a cache invalidation request after the second data storage unit is healed; and invalidating the cached metadata in the local memory of the client system.

Example 9 is the method of example 8 wherein the DFS client daemon is a userspace process.

Example 10 is a method comprising: receiving, by a DFS client daemon, a write request with respect to a file; identifying a first data storage unit storing a first replica of the file; identifying a second data storage unit storing a second replica of the file; determining that the first data storage unit is unavailable; determining that the second data storage unit is available; and responsive to determining, using metadata residing on a thin arbiter node, that the second data storage unit contains no stale file replicas, performing a write operation specified by the write request.

Example 11 is the method of example 10 further comprising: responsive to performing the write operation, modifying the metadata residing on the thin arbiter node.

Example 12 is the method of claim 10 further comprising: caching the metadata in a local memory of a client system.

Example 13 is the method of example 12 further comprising: responsive to performing the write operation, modifying the metadata cached in the local memory of the client system.

Example 14 is the method of example 13 wherein the metadata residing on thin arbiter node and the metadata cached in the local memory of the client system corresponds to a replica set comprising the first data storage unit and the second data storage unit.

Example 15 is the method of example 14 wherein the first data storage unit contains metadata associated with the second data storage unit and the second data storage unit contains metadata associated with the first data storage unit.

Example 16 is a method comprising: receiving, by a DFS client daemon, a read request with respect to a file; identifying a first data storage unit storing a first replica of the file; identifying a second data storage unit storing a second replica of the file; determining that the first data storage unit is unavailable; determining that the second data storage unit is available; and responsive to determining, using metadata residing on a thin arbiter node, that the second data storage unit contains at least one stale file replica, failing the read request.

Example 17 is the method of example 16 further comprising: responsive to determining that the second data storage unit contains no stale file replicas, performing, on the second replica of the file, a read operation specified by the read request.

Example 18 is the method of example 16 further comprising: responsive to determining, using metadata cached in a local memory of the client system, that the second data storage unit contains at least one stale file replica, failing the read request.

Example 19 is the method of example 18 wherein the first data storage unit is provided by a first physical storage device residing on a first data storage node and wherein the second data storage unit is provided by a second physical storage device residing on a second data storage node.

Example 20 is the method of example 19 wherein the metadata residing on thin arbiter node corresponds to a replica set comprising the first data storage unit and the second data storage unit.

Example 21 is the method of example 20 further comprising: responsive to determining, using metadata stored on the second data storage unit, that the first data storage unit contains at least one stale file replica, perform, on the second replica of the file, a read operation specified by the read request.

Example 22 is a non-transitory, computer readable storage medium storing instructions for a DFS client daemon, the instructions, when executed, to cause the processor to: identify a first and second data storage unit; determine that the first data storage unit is available and the second data storage unit is unavailable; and responsive to determining that the first data storage unit is stale, fail the write request.

Example 23 is the computer readable storage medium of example 22 wherein determining that the first data storage unit is stale is in view of metadata residing on a thin arbiter node.

Example 24 is the computer readable storage medium of example 22 the processor further to: cache the metadata in a local memory of a client system.

Example 25 is the computer readable storage medium of example 24 wherein determining that the first data storage unit is stale is in view of the metadata cached locally on the client system.

Example 26 is the computer readable storage medium of example 22 wherein the first data storage unit is provided by a first physical storage device and the second data storage unit is provided by a second physical storage device.

Example 27 is the computer readable storage medium of example 26 wherein the first physical storage device resides on a first data storage node and the second physical storage device resides on a second data storage node.

Example 28 is a system comprising: a memory; a processing device operatively coupled to the memory, the processing device to: identify a first and second data storage unit; determine that the first data storage unit is available and the second data storage unit is unavailable; and responsive to determining that the first data storage unit is stale, using metadata residing on the thin arbiter node, fail the write request.

Example 29 is the system of example 28 wherein the first data storage unit is a first physical storage device residing on a first data storage node and the second data storage unit is a second physical storage device residing on second data storage node.

Example 30 is the system of example 29 wherein the first data storage node is located at a first data storage center and the second data storage node is located at a second data storage center.

Example 31 is the system of example 30 wherein the thin arbiter node resides on a cloud system.

Example 32 is the system of example 30 wherein the thin arbiter node resides at a location separate from the first data storage node and the second data storage node.

Example 33 is the system of example 30 wherein the metadata residing on the thin arbiter node corresponds to the first data storage unit and the second data storage unit.

Example 34 is the system of example 33 wherein the metadata residing on thin arbiter node indicates whether the first data storage unit contains one or more stale file replicas and whether the second data storage unit contains one or more stale file replicas.

Example 35 is an apparatus comprising: a means for receiving, by a DFS client daemon, a write request with respect to a file; a means for identifying a first data storage unit storing a first replica of the file; a means for identifying a second data storage unit storing a second replica of the file; a means for determining that the first data storage unit is unavailable; a means for determining that the second data storage unit is available; a means for responsive to determining, using metadata residing on a thin arbiter node, that the second data storage unit contains at least on stale file replica, failing the write request.

Example 36 is a method comprising: receiving, by a self-heal daemon, a request to heal a data storage unit of a first data storage node; identifying an index of stale files, the index stored on a second data storage node; responsive to healing the stale files on the data storage node using the index of stale files, sending a cache invalidation request to a client system to invalidate a cache stored on the client system; and modifying metadata stored on a thin arbiter node.

Example 37 is a system comprising: memory; and a processing device operatively coupled to the memory, the processing device to implement the subject matter of any of examples 1-35.

Example 38 is a non-transitory machine-readable storage medium including instructions that, when accessed by a processing device, cause the processing device to implement the subject matter of any of examples 1-36.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems may appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device implementing a distributed file system client daemon of a distributed file system, a write request with respect to a file;
obtaining, by the processing device using topology information of the distributed file system, a replica set that identifies a set of data storage units of a plurality of data storage units storing replicas of the file, wherein the topology information comprises a configuration graph comprising a root node corresponding to a mounting point of the distributed file system, a plurality of leaf nodes corresponding to the plurality of data storage units, and a plurality of intermediate nodes corresponding to replication translators;
identifying, by the processing device using the replica set, a first data storage unit of the set of data storage units storing a first replica of the file and a second data storage unit of the set of data storage units storing a second replica of the file;
determining, by the processing device, that the first data storage unit is unavailable and that the second data storage unit is available;
responsive to determining that the first data storage unit is unavailable and the second data storage unit is available, retrieving, by the processing device, file system metadata associated with the replica set from a corresponding entry in a metadata file, wherein the metadata file resides on a thin arbiter node, determining, by the processing device using the file system metadata, that the second data storage unit contains at least one stale file replica; and
responsive to determining that the second data storage unit contains the at least one stale file replica, failing, by the processing device the write request.

2. The method of claim 1 wherein the first data storage unit is provided by a first data storage node and wherein the second data storage unit is provided by a second data storage node.

3. The method of claim 1 wherein the first data storage unit is provided by a first physical storage device residing on a first data storage node and wherein the second data storage unit is provided by a second physical storage device residing on a second data storage node.

4. The method of claim 1 further comprising:
caching at least a portion of the file system metadata in a local memory of a client system to obtain cached file system metadata.

5. The method of claim 4 further comprising:
determining, using the cached file system metadata, that the second data storage unit contains at least one stale file replica and; responsive to determining, using the cached file system metadata, that the second data storage unit contains the at least one stale file replica, failing the write request.

6. The method of claim 5 further comprising:
receiving, by the processing device from a self-heal daemon, a cache invalidation command; and
invalidating, by the processing device, the cached file system metadata.

7. The method of claim 1 wherein the distributed file system client daemon is implemented as a userspace process.

8. A system comprising:
a memory;
a processing device operatively coupled to the memory, the processing device to:
receive, by a distributed file system daemon of a distributed file system, a write request with respect to a file;
obtain, using topology information of the distributed file system, a replica set that identifies a set of data storage units of a plurality of data storage units storing replicas of the file, wherein the topology information comprises a configuration graph comprising a root node corresponding to a mounting point of the distributed file system, a plurality of leaf nodes corresponding to the plurality of data storage units, and a plurality of intermediate nodes corresponding to replication translators;
identify, using the replica set, a first data storage unit of the set of data storage units storing a first replica of the file and a second data storage unit of the set of data storage units storing a second replica of the file;
determine that the first data storage unit is unavailable and that the second data storage unit is available;
responsive to determining that the first data storage unit is unavailable and the second data storage unit is available, retrieve file system metadata associated with the replica set from a corresponding entry in a metadata file, wherein the metadata file resides on a thin arbiter node; and
responsive to determining, using the file system metadata, that the second data storage unit contains no stale file replicas, perform a write operation specified by the write request.

9. The system of claim 8 wherein the processing device is further to:
responsive to performing the write operation, modify the file system metadata residing on the thin arbiter node.

10. The system of claim 8 wherein at least a portion of the file system metadata is cached locally on a client system to obtain cached file system metadata, and wherein the second data storage unit is determined to contain no stale file replicas using the cached file system metadata.

11. The system of claim 8 wherein the first data storage unit contains file system metadata associated with the second data storage unit and the second data storage unit contains file system metadata associated with the first data storage unit.

12. A non-transitory machine-readable storage medium including instructions that, when accessed by a processing device, cause the processing device to:
receive, by a distributed file system daemon of a distributed file system, a read request with respect to a file;
obtain, using topology information of the distributed file system, a replica set that identifies a set of data storage units of a plurality of data storage units storing replicas of the file, wherein the topology information comprises a configuration graph comprising a root node corresponding to a mounting point of the distributed file system, a plurality of leaf nodes corresponding to the plurality of data storage units, and a plurality of intermediate nodes corresponding to replication translators;
identify, using the replica set, a first data storage unit storing a first replica of the file and a second data storage unit storing a second replica of the file;
determine that the first data storage unit is unavailable and that the second data storage unit is available;

responsive to determining that the first data storage unit is unavailable and the second data storage unit is available, retrieve file system metadata associated with the replica set from a corresponding entry in a metadata file, wherein the metadata file resides on a thin arbiter node;

determine, using the file system metadata, that the second data storage unit contains at least one stale file replica; and responsive to determining that the second data storage unit contains the at least one stale file replica, fail the read request.

13. The non-transitory machine-readable storage medium of claim 12 wherein the processing device is further to:

cache at least a portion of the file system metadata in a local memory of a client system to obtain cached file system metadata;

determine, using the cached file system metadata, that the second data storage unit contains at least one stale file replica.

14. The non-transitory machine-readable storage medium of claim 13 wherein the first data storage unit is provided by a first physical storage device residing on a first data storage node and wherein the second data storage unit is provided by a second physical storage device residing on a second data storage node.

15. The non-transitory machine-readable storage medium of claim 14 wherein the processing device is further to:

determine, using metadata stored on the second data storage unit, that the first data storage unit contains at least one stale file replica; and responsive to determining that the first data storage unit contains at least one stale file replica, perform, on the second replica of the file, a read operation specified by the read request.

* * * * *